April 11, 1961　　　E. H. TUBBS　　　2,978,859
NUT GATHERING AND BAGGING MACHINE
Filed July 2, 1958　　　8 Sheets-Sheet 2

INVENTOR.
Elton H. Tubbs,
BY John A. Bowers
ATTORNEY.

April 11, 1961    E. H. TUBBS    2,978,859
NUT GATHERING AND BAGGING MACHINE
Filed July 2, 1958    8 Sheets-Sheet 6

INVENTOR.
Elton H. Tubbs,
BY
John Lowers
ATTORNEY.

April 11, 1961 E. H. TUBBS 2,978,859
NUT GATHERING AND BAGGING MACHINE
Filed July 2, 1958 8 Sheets-Sheet 7

INVENTOR.
Elton H. Tubbs.
BY John Sloano
ATTORNEY.

April 11, 1961

E. H. TUBBS

2,978,859

NUT GATHERING AND BAGGING MACHINE

Filed July 2, 1958

INVENTOR.
Elton H. Tubbs,
BY John S. Powers
ATTORNEY.

United States Patent Office 2,978,859
Patented Apr. 11, 1961

2,978,859

NUT GATHERING AND BAGGING MACHINE

Elton H. Tubbs, 162 N. Portage St., Westfield, N.Y.

Filed July 2, 1958, Ser. No. 746,112

11 Claims. (Cl. 56—328)

This invention relates to a machine for gathering and bagging pecans or other nuts which fall to the ground when ripe and, without any processing operation, may be packed for shipment, the invention proposing a motor driven wheeled machine under the control of a single operator.

The principal object is a compact machine which in one operation, performed continuously during its travel, picks the nuts from the ground, separates them from such debris as leaves and pebbles, conveys them to the bagging feature, discharges them into the bag, and discards the separated worthless debris, the machine in such operation being characterized by a combined suction and air pressure system in which the suction and air pressure sides are mutually occluded, and by conduits utilizing suction, air pressure and gravity as the sole means for conveying the nuts, one of the conduits through which a strong current of air is forced functioning as a conveyor for the nuts which have been gathered and being arranged to discharge them into a receiving bag.

A further object is a machine which continuously during its travel separates all debris from the nuts, accomplishing such separation in separate stages pursuant to a common suction influence, one stage involving the separation of the pebbles and the second involving the separation of the leaves and leaf fragments.

A further object is a machine which by means of a single rotary air pump and an associated conduit system effects complete debris separating operations together with the operation of conveying the nuts to an elevated point of discharge from which they fall into a receiving bag.

A further object is a machine extremely light in weight which may be operated with intrinsically optimum economy and with optimum quantitative results and which, by virtue of the characteristics of its performance, i.e., the delivery of the nuts in clean condition, the elimination of further processing operations, and the bagging of the nuts in readiness for immediate shipment, involves an overall economy in substantial degree.

The machine, in respect to the nut gathering and bagging operations includes generally (1) a series of flexible tubes which severally carry (2) the nut gathering elements maintained at a suitable elevation above the ground surface, (3) a separating chamber to which the tubes are connected and into which the nuts are drawn under a suction influence, the separating chamber having (4) a wall in the form of a screen in open communication with (5) a pocket normally closed to maintain the suction influence, small pebbles dropping by gravity through the screen into the pocket, (6) a rotary air pump operated by an internal combustion engine connected to the separating chamber and creating the suction and air pressure influence, the leaves passing from the separating chamber into the negative side of the casing of the air pump and being thence discharged and the separating chamber being of such depth that while the leaves move upward into the casing of the air pump the nuts move downward along the screen and are discharged by gravity from the lower end of the separating chamber, (7) a nut transfer element having a compartmented rotary air-lock feature which occludes communication between the suction and pressure sides and into which the nuts fall from the separating chamber and by which they are discharged by gravity, (8) a nut collecting chamber into which the nuts fall from the transfer element, (9) a connection between the nut collecting chamber and the positive side of the pump casing for the transmission of air under pressure, (10) a nut discharging conduit leading from the nut collecting chamber and through which the nuts are forced under the pressure of air to the point of discharge, and (11) a holder for a bag into which the nuts fall by gravity from the nozzle end of the discharge conduit.

The various parts of the machine are carried by a chassis C (Figures 1 and 2) of rectangular outline which includes parallel side bars 1 and 1a, preferably of tubular form having at their front ends down-turned portions 2, a front cross bar 3 preferably of bumper form and function connected as by welding to the lower ends of the portions 2, and a rear cross bar 4 connected as by welding to the side bars 1 and 1a.

The machine travels upon front wheels 5 and rear wheels 6 thus making the machine a wheeled chassis. The axle 7 of each front wheel 5 is mounted in a frame 8 (Figure 14) which includes a bar 9 L-shaped in side elevation and having a vertical arm 10 and a horizontal arm 11 extending forward from the lower end of the vertical arm, a vertical bar 10a parallel to the arm 10 and a cross bar 12 connecting the upper ends of the vertical arm 10 and the bar 10a, the cross bars 12 being under and adjacent the side bars 1 and 1a and connected to them as by welding. The horizontal arms 11 are connected at their forward ends as by welding to the front cross bar 3. The axle 7 of each front wheel 5 is located at the junction of the arms 10 and 11 and is utilized as an intermediate bracing connection between the bars 10 and 10a.

The rear wheels 6 are mounted on individual axles 13 and are supported by a frame or yoke 14 (Figure 4) which comprises a cross bar 15 and depending vertical arms 16, the axles 13 being connected to the arms 16 near their lower ends. The wheels 6 are preferably connected by transverse rods 17, one of the wheels 6 being directly connected to power. The cross bar 15 has a central pivotal mounting upon a vertical pin 18 (Figure 6) and the yoke 14 is connected adjacent the ends of the cross bar to a U-shaped member 19 which forms an element of the steering mechanism and projects horizontally forward from the yoke 14.

A driver's seat 20 is supported in an elevated position at the front of the machine by a suitable frame 21 (Figures 1 and 3) consisting of two members extending transversely in parallel relation and each comprising a horizontal bar 22 and depending legs 23 connected at their lower ends to the chassis side bars 1 and 1a.

Figure 11:
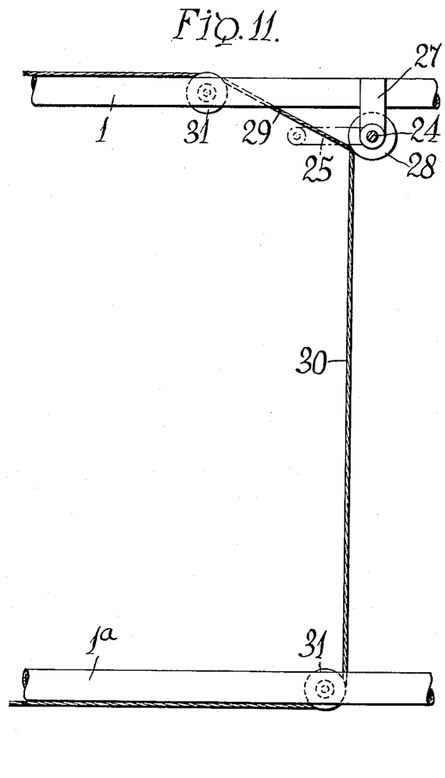
Figure 11 is a horizontal sectional view on the line 11—11 of Figure 3, showing certain details of the steering feature of the machine.

The steering mechanism includes a vertical shaft 24 adjacent the set 20 which has a crank handle 25 at its upper end. The shaft 24 is journaled near its upper end in a bar 26 (Figure 2) extending between and connected to the bars 22 and near its lower end in a sleeve bracket 27 (Figure 3) secured to the adjacent chassis side bar 1. The shaft 24 extends below the bracket 27 and at its lower end carries a reel 28 to which are connected the ends of cables 29 and 30, these being wound in opposite direction (Figure 11) upon the reel 28. The cables 29 and 30 respectively extend adjacent the chassis side bars 1 and 1a and are trained over pulleys 31 (Figure 2) carried by the side bars. Near the rear end of the machine the cables are trained in opposite directions over the member 19 which is preferably of channel section, the ends of the respective cables being connected to the opposite ends of the member 19. In steering the machine the yoke 14 is turned in one direction or the other about its pivot 18 by appropriate turning movement of the shaft 24, one of the cables being wound upon the reel 28 and the other cable being paid out with its slack taken up by the member 19. It will be obvious that when the yoke 14 is thus turned about its pivot the angular positions of the wheels will be correspondingly changed and the machine will be turned in the direction and to the extent that may be required.

Figures 8, 15, 17:
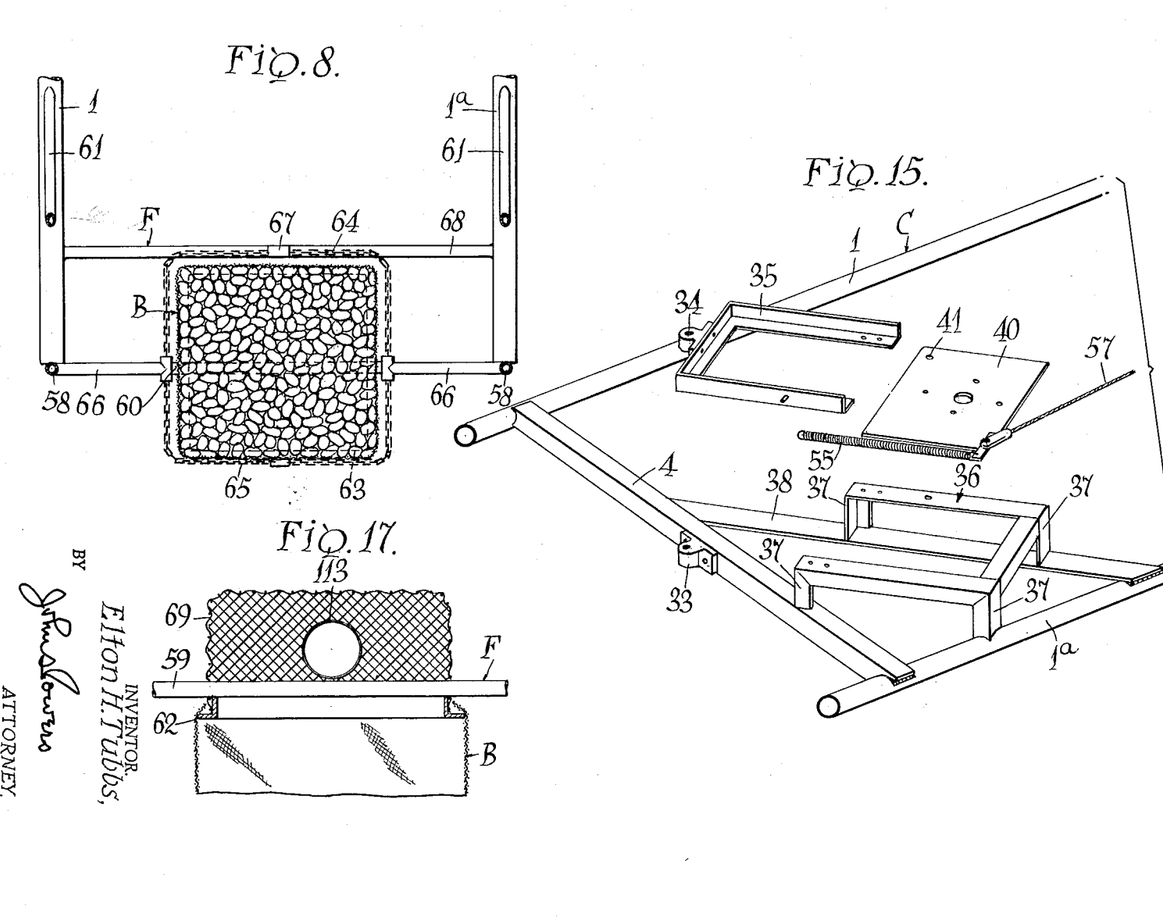
Figure 8 is an enlarged horizontal section on the line 8—8 of Figure 1, showing details of the bag supporting features.
Figure 15 is an exploded perspective view showing sundry frame elements which are utilized for the support of a propulsion motor and the driving gear features between the motor and the rear wheels.
Figure 17 is an enlarged cross sectional view on the line 17—17 of Figure 2 showing the angle bar form of the bag holding frame.

The cross bar 15 of the yoke 14 is preferably of angle iron section (Figure 6) and the pin 18 is connected for support against vertical displacement to the bar 15 from which it extends upward, the connection including a securing screw 32 which extends through the vertical flange of the bar 15, the lower portion of the pin 18 and a spacer 32a bearing against the vertical flange and the pin. The pin 18 is held against angular displacement by lower and upper sleeves 33 and 34 in suitably spaced relation. The sleeve 33 is attached to the rear cross bar 4 of the chassis. The sleeve 34 is carrier by the cross piece of a U-shaped bracket 35 (Figure 15) which is preferably of angle iron section. The bracket 35 is attached, as by bolt and nut fastenings, to the side bars of a rectangular suporting frame 36 having corner legs 37, the legs at one side of the frame 36 being secured, as by welding, to the cross bar 4 and the chassis side bar 1a and at the other side of the frame 36 being similarly secured to a supporting bar 38 which extends diagonally between the chassis side bar 1a and the cross bar 4. The frame 36 also provides support (Figure 2) for the propulsion motor 39 (an internal combustion engine) which is directly mounted upon a horizontal plate 40 in turn supported upon the frame 36, the plate 40 being pivotally connected as at 41 to the frame 36. The angular position of the plate 40 with relation to its pivot 41 determines the driving or non-driving position of the motor 39, the driving position being shown in Figures 2 and 10 in full lines and the non-driving position being shown in Figure 10 in broken lines.

The driving connections between the motor 39 and the wheels 6 include a horizontal shaft 42 mounted in a gear box 43 which encloses suitable reduction gearing (not shown) operated by a vertical shaft 44 which extends upward from the gear box 43. Beyond the gear box 43 the shaft 42 carries a sprocket 45, a corresponding sprocket 46 (Figure 16) being connected in concentric relation to one of the wheels 6. The sprockets 45 and 46 are connected by a chain 47. Since the wheels 6 are connected by the rods 17 driving power applied directly to one of them, as by the sprocket 46, is directly transmitted to the other. The shaft of the motor 39 extends vertically and at its lower end (Figure 4) carries a pulley 48 for a V belt 49 which is trained over a corresponding pulley 50, the hub 51 of which is rotatably mounted on the pin 18 between the sleeves 33 and 34. The hub 51 is common to the pulley 50 and a second pulley 52 for a V belt 53 which is trained over a corresponding pulley 54 mounted upon the shaft 44 of the reduction gearing in the gear box 43. It will be noted that the driving connections as a whole are of speed reducing character; thus the pulley 48 is of suitably less diameter than the pulley 50 to which it is connected by the belt 49, the shaft 44 drives reduction gearing in the box 43, and the sprocket 45 is of less diameter than the companion sprocket 46. By virtue of the speed reducing characteristics of the driving connections the machine will be driven at a very slow rate, that is to say of the order of from four to six miles per hour.

Figures 1, 14, 16, 18:
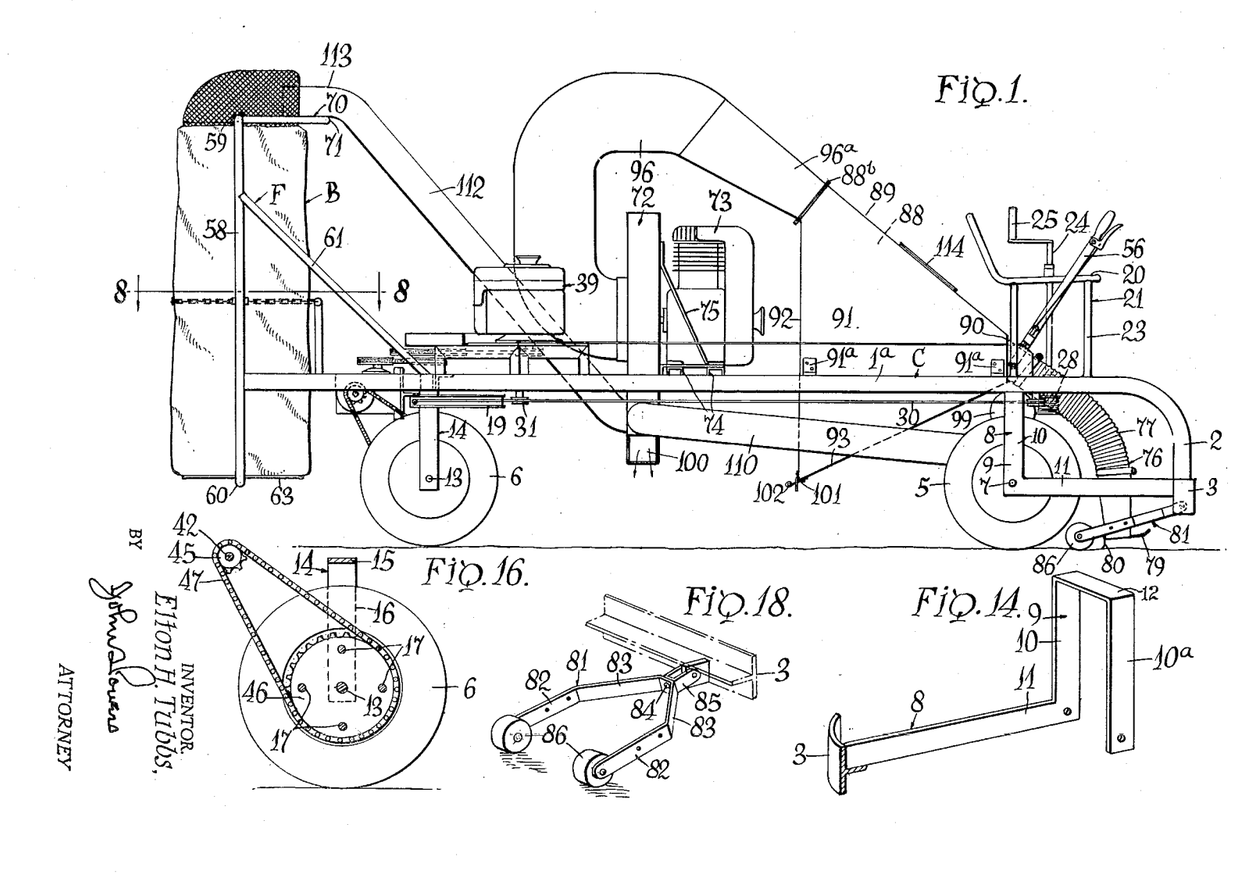
Figure 1 is a side elevation of a machine in which the features of the invention are incorporated.
Figure 14 is a perspective view of a frame for the support of each front wheel of the machine.
Figure 16 is a sectional view on the line 16—16 of Figure 7 showing the sprocket features for the direct application of driving power to one of the rear wheels.
Figure 18 is a detail perspective view of a yoke and sundry associated parts used in the support of a picker element from the ground.
Figures 2, 6, 7:
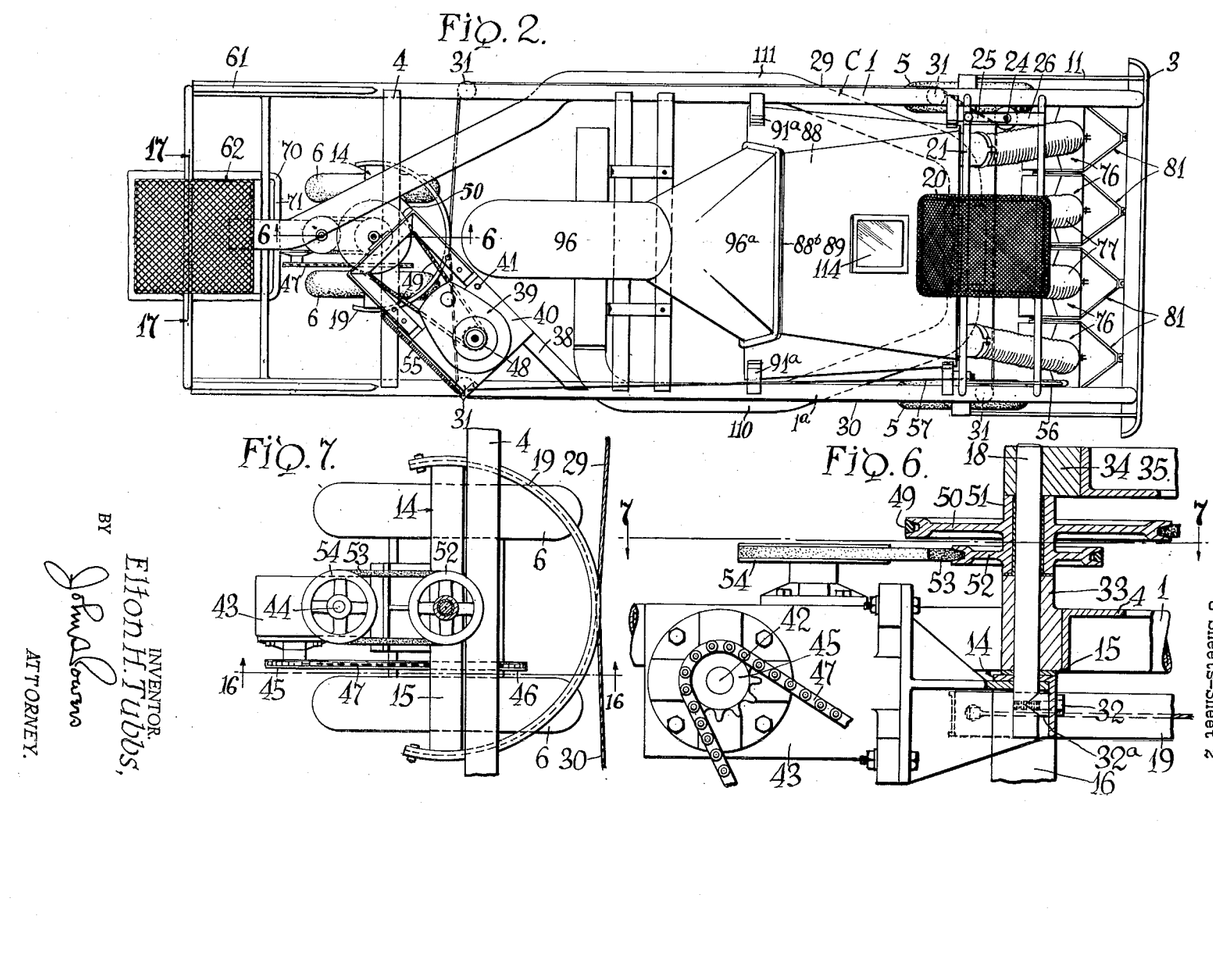
Figure 2 is a plan view.
Figure 6 is an enlarged view partly in elevation and partly in section on the line 6—6 of Figure 2, showing sundry details of the driving and steering mechanism.
Figure 7 is a view partly in plan and partly in section on the line 7—7 of Figure 6 of the details shown in Figure 6.
Figure 5:
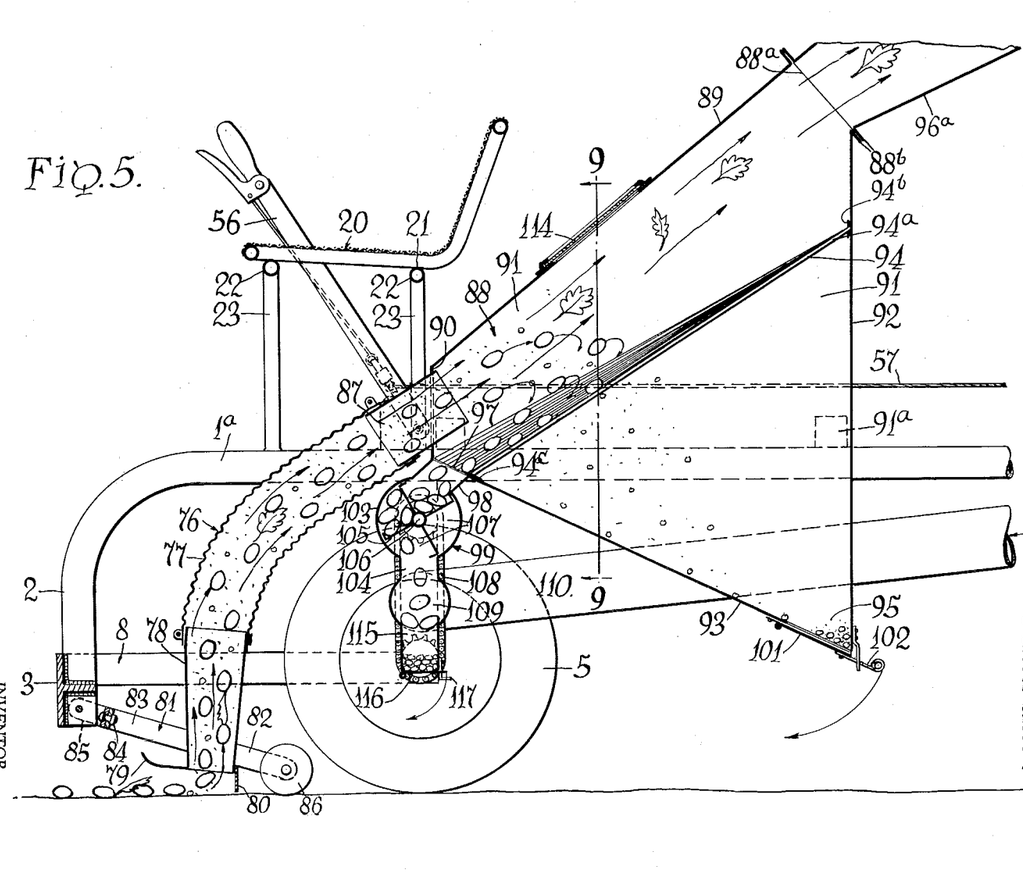
Figure 5 is an enlarged partial vertical sectional view on the line 5—5 of Figure 3.
Figure 10:
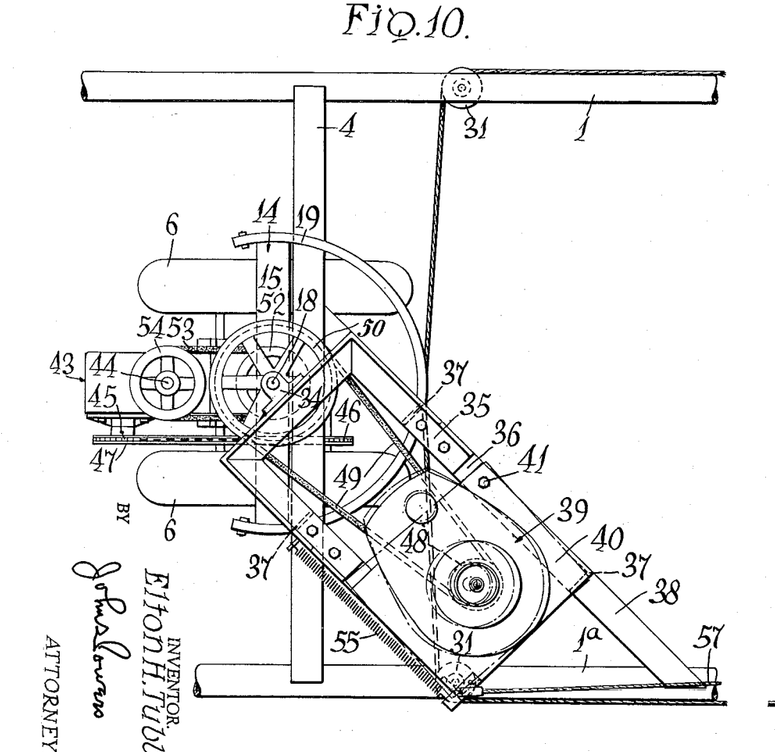
Figure 10 is a plan view on an enlarged scale showing details of the motor mounting and driving connections for the propulsion of the machine.

The purpose of the pivotal mounting of the plate 40 is for the selection of either of two positions of the motor 39 in one of which, shown in Figure 2 and in full lines in Figure 10, the belt 49 is under tension and effects the rotation of the pulley 50 with the resultant application of power to the wheels 6 and in the other which, shown in broken lines in Figure 10, the belt 49 is slack and no power is transmitted from the motor 39 to the wheels 6. The plate 40 is moved to the position in which the belt 49 is slack by a tensioned spiral spring 55, one end of which is connected to a side piece of the bracket 35 and the other end of which is connected at an appropriate point to the plate 40. The particular position of the plate 40 is controlled by the driver by means of a lever 56 (Figure 5) connected by a cable 57 to the plate 40 (Figure 10) at a point diagonally opposite the pivot 41. When the lever 56 is pushed forward the plate 40 is moved from the engine-inoperative broken line position (shown in Figure 10) to the engine-operative full line position and the belt 49 is thereby tensioned with resultant application of driving power to the wheels 6. When it is desired to stop the movement of the machine the lever 56 is pulled back, that is to say to the left (Figure 1 being considered) whereupon, the cable 57 being slack, the spring 55 moves the plate 40 about its pivot 41 to the broken line position shown in Figure 10, such movement of the plate 40 being limited by its engagement with the end of that side arm of the bracket 35 which is remote from the pivot 41. When the plate 40 has been thus moved by the spring 55 the tension of the belt 49 is relieved and, the belt being slack, no power is transmitted to the wheels 6.

Figure 4:
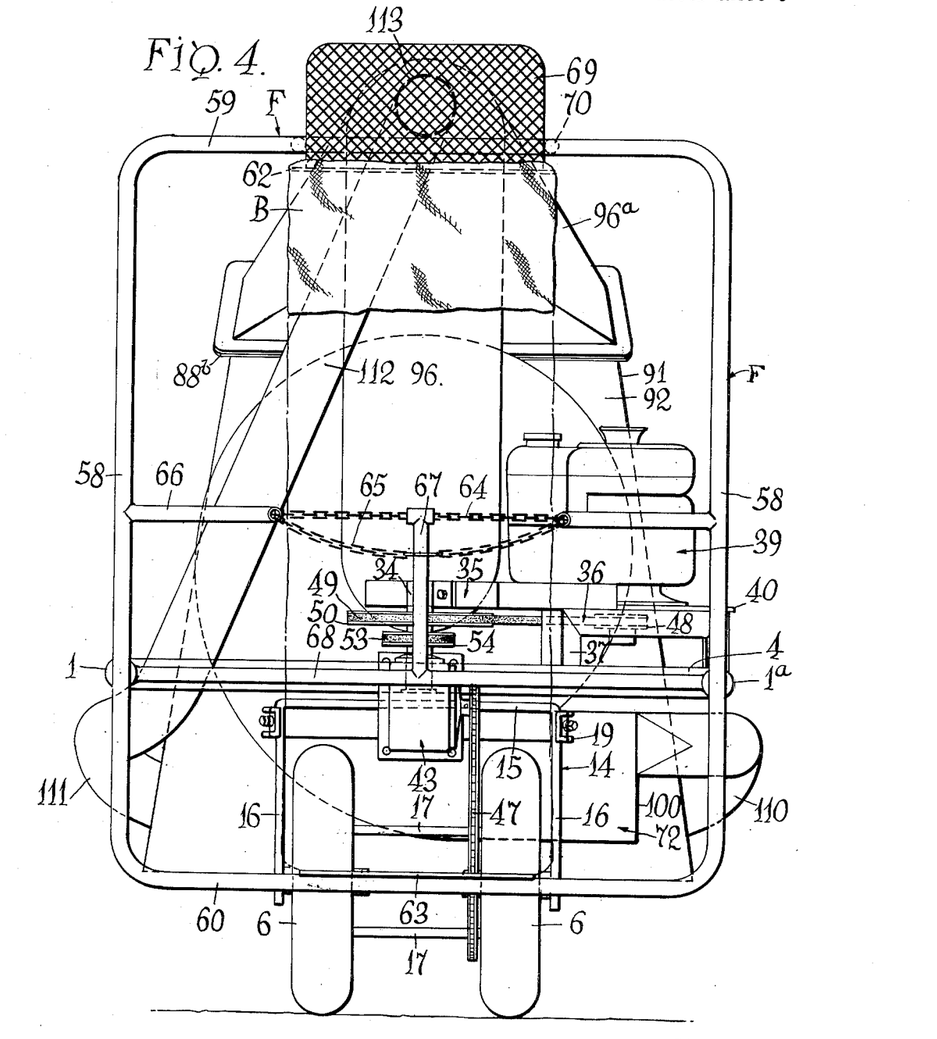
Figure 4 is a rear elevation, certain parts being broken away to enable clarity of illustration of other parts.

The bag holding feature is mounted at the rear end of the machine and includes a vertical rectangular supporting frame F (Figure 4) composed of vertical side bars 58, an upper cross bar 59 and a lower cross bar 60. The frame F is rigidly supported by the chassis, its vertical side bars 58 being attached in any suitable manner to the rear ends of the chassis side bars 1 and 1a and also being connected to downwardly inclined reinforcing struts 61 (Figure 1) which are secured in any suitable manner to the chassis side bars. The upper cross bar 59 carries a horizontal bag holding frame 62 (Figures 2 and 17) of rectangular outline and angular section and the lower cross bar 59 carries a bag supporting platform 63 (Figures 1 and 4). The bag B is made of burlap or coarse woven fabric and its upper end into which the nuts are discharged is lapped over the horizontal flange of the frame 62, the bag being hooked, so to speak, over the sharp corners of the frame 62 with its bottom resting upon the platform 63. In order that the bag may be held against displacement from the platform 63 it is surrounded midway of its extent by light chains 64 and 65, the ends of which are secured to horizontal arms 66 carried by the bars 58 and projecting inward. The chains 64 which adjoin the inner side of the bag are made in two elements connected at their inner ends to a vertical post 67 which extends upright from a cross bar 68 secured to the chassis side bars. The frame 62 carries a screen cover 69 which intercepts the discharging nuts, causing them to fall into the bag B, and provides for the escape to atmosphere of the air under pressure by which the nuts were conveyed to the point of discharge. The screen cover 69 is formed at its sides with openings to accommodate the upper cross bar 59 of the frame F. The cross bar 59 carries a horizontal U-shaped bracket 70 (Figures 1 and 2) having a cross piece 71 which extends under and provides support for the upper end of the conduit (later to be described) through which the nuts pass for discharge into the bag B.

The suction and air pressure influences utilized for the gathering of the nuts and for conveying them to the point at which they are discharged into the bag B are developed by a rotary air pump 72 (Figure 1) of any suitable known construction which is sufficiently indicated by the showing of its casing. The air pump is arranged transversely in a vertical position and the shaft of its impeller is connected to the shaft of an internal combustion engine 73 which is supported upon cross bars 74 secured at their ends to the chassis side bars 1 and 1a. The pump 72 is supported by suitable brackets 75 attached to its casing and carried by the cross bars 74.

For gathering the nuts from the ground a number of pickers are provided, each designated generally as 76, these being arranged in a transverse series at the front end of the machine and operative under the suction influence of the pump 72. Each picker 76 includes a section of flexible tubing 77 which carries at its lower end a tubular open-ended picker element 78 provided with a nut intercepting feature. This feature consists of a substantially horizontal flange 79 (Figure 5) projecting forwardly from the front edge of the element 78 in suitably spaced relation to the surface of the ground and a downwardly extending resilient flange or strip 80 projecting from the rear edge of the element 78 and terminating slightly short of the surface of the ground. As the machine is advanced the flange 79 passes over the nuts which thereupon, responsive to the suction influence as transmitted through the flexible tube 77, are drawn through the picker 76. The flange 80 insures that all of the nuts over which the flange 79 passes will be subject to the suction influence and drawn through the picker.

The element 78 is supported at the proper distance from the ground surface by a yoke 81 (Figures 5 and 18) which includes parallel arms 82 and a connecting bow piece 83. The bow piece is pivoted at a central point as at 84 (Figure 5) for horizontal swinging movement to a clevis 85 in turn pivoted for vertical swinging movement to the chassis front bar 3. By reason of the pivot 84 and the pivoted clevis 85 the yoke has a universal mounting. The arms 82 are connected, preferably rigidly, to the sides of the element 78 and extend rearward beyond the element, each arm being provided beyond the element with a ground engaging terminal roller 86. The yoke 81 and rollers 86 compensate for any slight irregularities in the surface of the ground and positively hold the element 78 at the proper elevation relatively to the ground surface.

The pickers 76 are connected to the negative side of the pump 72, the flexible tubes 77 being severally suitably attached to short pipes 87 which extend from and are in open communication with a separating chamber 88 having a width substantially equal to the width of the chassis and through which the suction influence is transmitted to the pickers 76. The chamber 88 has a top wall 89, a front wall 90 from which the pipes 87 extend, side walls 91, a rear wall 92, a bottom wall 93 extending from the front wall 90 and an intermediate wall 94 of screen like formation. The top wall 89 and the intermediate wall 94 extend upward and rearward, the wall 94 preferably being at a more acute angle to the horizontal than the wall 89, at its upper end meeting and being connected to the rear wall 92, and at its lower end meeting and being connected to the bottom wall 93. The side walls 91, the rear wall 92 and the bottom wall 93 provide a pebble collecting pocket 95 below the intermediate wall 94 and which forms a part of the separating chamber, the rear wall 92 and the bottom wall 93 being convergent and meeting at an acute angle at the lower end of the pocket.

The chamber 88 and the various parts connected to it are supported from the chassis side bars 1 and 1a by means of brackets 91a attached to the walls 91 and suitably connected to the side bars.

The chamber 88 communicates at its upper end by an opening 88a with the funnel-like section 96a of a suction conduit 96 connected to the casing of the pump 72 at its negative side. The opening 88a is defined by the top wall 89, the side walls 91 and the rear wall 92, these walls being joined by a flange connection 88b to the lower end of the conduit section 96a. The intermediate wall 94 meets the rear wall 91 at a point suitably below the opening 88a.

The distance between the lower ends of the top wall 89 and the intermediate wall 94 is substantially greater than the diameters of the pipes 87 and the bottom wall 93 meets the front wall 90 at a point above the intermediate wall 94. Between the front wall 90 and the intermediate wall 94 the bottom wall 93 is formed with a centrally located recess, the bottom wall and the front wall thereby delimiting a rectangular opening 97 which communicates with a forwardly and downwardly inclined pipe element 98 of rectangular section leading to an air-lock chamber 99 later to be described in detail. The nuts, small pebbles and leaves are drawn through the pickers 76 into the chamber 88. The volume of the chamber 88 is such that the suction influence within it is substantially less in degree than the suction influence within each picker 76 for which reason the nuts entering the chamber 88 will fall by gravity upon the wall 94 and will thereupon move downward by gravity along the wall 94 toward and through the opening 97 and the pipe element 98 into the air-lock chamber 99. The pebbles fall through the screen wall 94 into the pocket 95 and the leaves pass from the chamber 88 through the suction conduit 96 into the casing of the pump 72 from which they are discharged through the outlet 100.

Since the wall 94 joins the rear wall 92 at a point suitably below the opening 88b the nuts cannot be carried by suction with the leaves into the conduit section 96a. The suction influence in the chamber 88 being substantially reduced in degree as compared with its influence in the tubes 77, the nuts will fall upon the wall 94 at a stage of their movement in the chamber 88 and since this wall is at all points upon which the nuts fall below the opening 88a the only continued upward travel of the nuts will be by momentum. When the momentum is exhausted or interrupted (as by the rear wall 92) the nuts will respond to gravity and move downward along the wall 94, thence issuing from the chamber 88 through the opening 97 and pipe element 98.

Figures 9, 12, 13, 19:
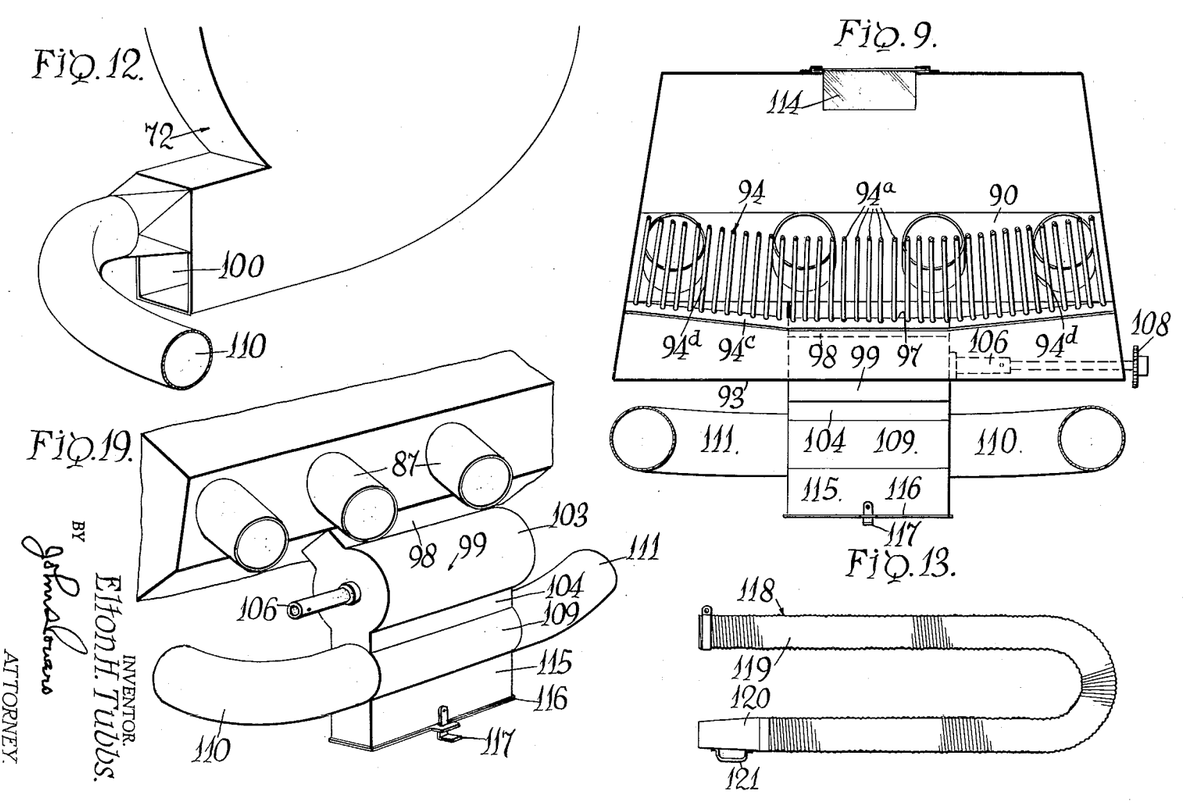
Figure 9 is a detail sectional view on the line 9—9 of Figure 5, showing more particularly the separating chamber to the front wall of which is connected the series of flexible tubes which carry the units of the nut gathering feature.
Figure 12 is an enlarged detail perspective view of the discharge features of the casing of the air pump or blower which creates the suction and pressure influences.
Figure 13 is an elevation of a manually directed nut gathering feature which may be applied to the machine for the purpose of picking from the ground the "stray" nuts which may have been left by the machine during its normal travel.
Figure 19 is a detail perspective view of the air-lock chamber, the nut collecting chamber and the conduits communicating with the nut collecting chamber at its opposite ends.

The wall 94 may be made in different forms but is preferably of the form shown (Figures 5 and 9) which includes a series of parallel bars 94a sufficiently close to one another to prevent the nuts from falling into the pocket 95. The wall 94 also includes an attachment strip 94b to which the upper ends of the bar 94a are connected and which is attached to the rear wall 92 and an attachment strip 94c to which the lower ends of the bars are connected and which is attached to the bottom wall 93.

The pipe element 98 is immediately below the intermediate short pipes 87 and is in the direct path of the falling nuts which issue from them. In order that the nuts, issuing from those pipes 87 which are located laterally beyond the pipe element 98, may be directed toward it the intermediate wall 94 has upwardly and outwardly inclined lateral portions 94d along which the nuts descend laterally by gravity until they reach a point where they aline with and may pass by gravity downward along the wall 94 and through the pipe element 98.

The bottom wall 93 includes a hinged lower section 101 normally held closed against the lower end of the wall 92 by a latch 102. When the pebbles have accumulated to a certain extent the movement of the machine is stopped. The operator then manipulates the latch 102 to release the lower wall section 101 which thereupon swings to open position, the pebbles falling from the pocket 95 to the ground. When the section 101 moves to its open position the vacuum is broken and, the machine being at rest, there is no operation of any of the features. When the pebbles have been discharged the bottom wall section 101 is moved to its closed position whereupon the suction influence is restored and the movement of the machine and its operations are continued.

The air-lock chamber 99 includes a cylindrical casing 103 which at a point diametrically opposite the pipe element 98 communicates with a depending nut-discharging pipe element 104. The air-lock chamber also includes a rotatable series of partitions 105 extending radially from a rotatable shaft 106 and at their outer edges formed for substantial air sealing engagement with the inner face of the casing 103, the partitions 105 providing a series of rotatable compartments 107. As the series of partitions 105 is rotated the compartments 107 are successively brought into registry with the pipe element 98, the nuts thereupon falling into the registering compartment. In like manner the compartments 107 are successively brought into registry with the nut-discharging pipe element 104, the nuts thereupon falling from the registering compartment through the pipe element 104.

The shaft 106 is journaled in the end walls of the casing 103 and is extended laterally beyond one end of the casing (Figure 3) through a journal in the bar 10a of the adjacent wheel supporting frame 8, the shaft being driven by chain and sprocket gearing 108 from the adjacent front wheel 5.

The pipe element 104 communicates with a nut collecting chamber 109 in the form of a cylindrical casing transversely arranged and in which there is a strong pressure influence. The air sealing engagement of the partitions 105 with the inner face of the casing 103 occludes the vacuum side of the system from the pressure side, that is to say prevents the air under pressure in the chamber 109 from escaping into separating chamber 88 and likewise prevents the suction influence in the chamber 88 from being transmitted to the chamber 109. The chamber 109 at one end thereof is in open communication with a pipe 110 which leads from the casing of the air pump 72 at the positive side of the impeller and transmits a strong current of air, the pipe 110 extending for most of its length along one side of the machine. At its opposite end the chamber 109 is in open communication with a nut conveying conduit 111 which extends substantially horizontally along the opposite side of the machine to a point beyond the pump 72 at which point it has an upwardly inclined run 112 which terminates in a short horizontal nut discharging nozzle 113. The chamber 109, pipe 110 and conduit 111 are preferably co-axial and coextensive in diameter.

The nozzle 113 has supporting engagement upon the bracket 70 and projects through an opening in the screen cover 69 to a point above the bag B, the nuts which issue from the nozzle 113 falling into the bag. The current of air conveyed through the conduit 111 and its run 112 is of ample strength readily to carry the nuts to the elevated point of discharge. The casing 109 at its lower side is formed with a depending pebble trap 115 (Figure 5) having a hinged bottom 116 which is normally held closed by a latch 117. Any pebbles which may be too large to pass through the screen wall 94 of the separating chamber 88 will pass with the nuts into the compartments 107 and, being substantially heavier than the nuts, will fall into the trap 115, the nuts being carried by the strong air current through the conduit 111. The trap 115 is emptied from time to time by releasing the latch 117 and opening the bottom 116, the pebbles falling to the ground after which, of course, the bottom is moved to its closed position and secured by the latch 117.

In order that the operator may readily inspect the performance of the pickers 76 and the accumulation of pebbles in the pocket 95 a transparent panel 114 is provided in the top wall 89 of the chamber 88 at a point back of the driver's seat 20.

Figure 3:
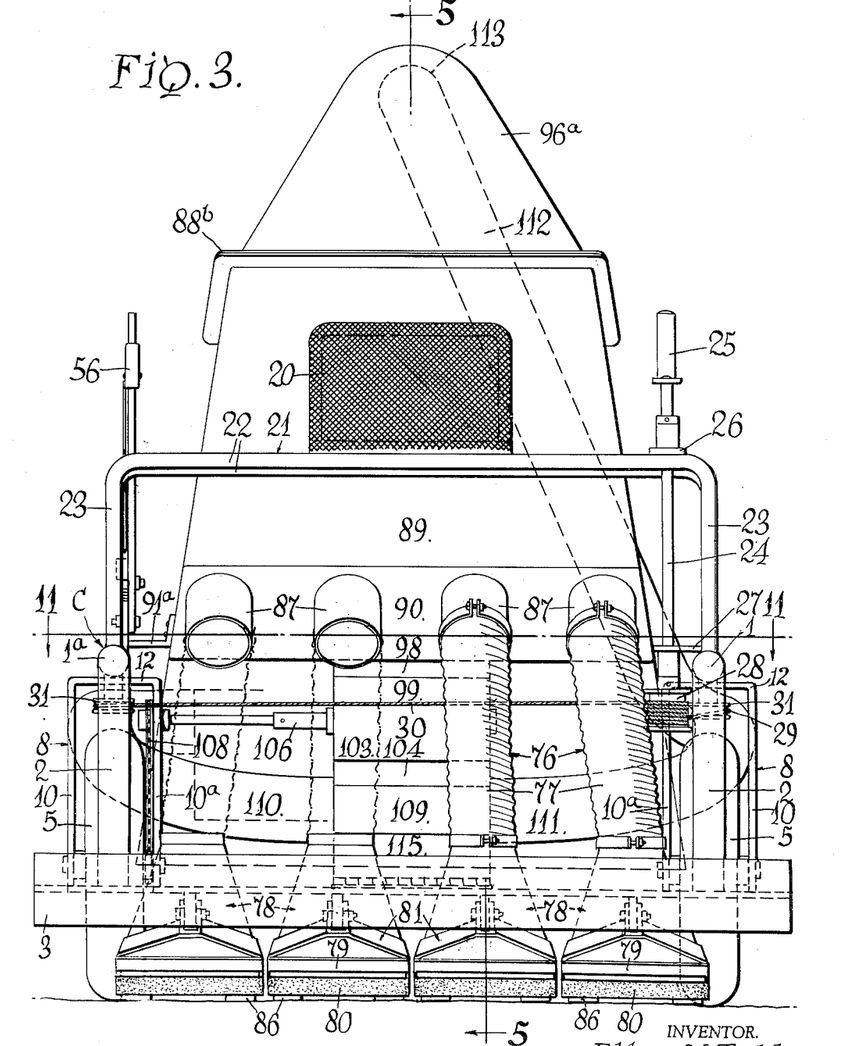
Figure 3 is a front elevation, two sections of flexible tubing at the left side of the figure being omitted to enable clarity of illustration of other parts.

The machine with the four pickers 76 as shown in Figure 3 assumes a grove wherein the trees are planted in orderly rows with aisles between them and that the machine is to be driven along the aisles. However in cases where the trees may be at irregular intervals or where the nuts may not be accessible to the pickers 76 it will be desirable to arrest the movement of the machine from time to time and to employ the manually held and directed picker 118 shown in Figure 13. When the use of the picker 118 is desired a picker 76 at either side of the machine may be removed from the short pipe 87 to which it was attached and the picker 118 substituted. The picker 118 includes an elongated flexible tube 119 which at its free end carries a picker element 120 of substantially the same form as the picker elements 78. The picker element 120 is provided with a handle 121 by which it may be conveniently moved over the ground to gather the various "stray" nuts. It will be understood that when the picker 118 is used the operator leaves his seat 20 and walks along the ground, holding the picker element 120 adjacent the surface of the ground at such points as may be required.

I claim:

1. A machine for gathering nuts from the surface of the ground which comprises, in combination: a self-propelled wheeled chassis; a transverse series of nut pickers at the front end of the chassis, each consisting of a section of flexible tubing and a tubular open-ended picker element carried by the section at its free end; a separating chamber extending lengthwise of the machine in which a suction influence is created, the separating chamber having front and rear ends, the sections of flexible tubing being connected to the front end of the separating chamber for communication therewith, the suction influence being transmitted through the sections of flexible tubing to the picker elements; the separating chamber being formed to effect the separation by gravity of the nuts from the pebbles which are carried into the separating chamber by the suction influence and to effect the discharge by gravity of the pebbles and the nuts at separate points; a conduit connected to the rear end of the separating chamber and extending from it lengthwise of the machine, the conduit being subject to the same suction influence, the leaves carried into the separating chamber with the nuts passing into the conduit and being separately discharged; a nut collecting chamber which is subject to a pressure influence and which receives the nuts from the separating chamber; a rotary air pump having a negative side and a positive side, the air pump at its negative side being connected to the conduit and creating the suction influence aforesaid and at its positive side being connected to the nut collecting chamber and creating the pressure influence aforesaid; a motor carried by the chassis for the operation of the air pump; an airlock chamber interposed between the separating chamber and nut collecting chamber, and including a cylindrical casing in communication with the separating chamber and with the nut collecting chamber and a series of rotatable radially extending partitions within the casing which define rotatable compartments, the nuts as issuing from the separating chamber falling into the compartments of the air lock chamber and falling from them into the nut collecting chamber; means operatively associated with the chassis for effecting the rotation of the partitions of the air lock chamber; and a nut conveying and discharging conduit communicating with the nut collecting chamber and subject to the pressure influence within the nut collecting chamber, the air delivered under pressure to the nut collecting chamber flowing through the nut conveying and discharging conduit and conveying the nuts through it to the point of discharge, the nut conveying and discharging conduit having a nut receiving and a nut discharging end, the nut discharging end being elevated relatively to the nut receiving end, the air lock chamber by means of its casing and the rotatable partitions occluding communication between the separating chamber and the nut collecting chamber.

2. A machine as set forth in claim 1 wherein a frame for the support of a nut receiving bag in a vertical position with an open upper end is provided at the rear end of the chassis and the nut conveying and discharging conduit has support adjacent its discharge end and has its discharge end above the open end of the bag as supported by the frame, the nuts falling from the discharge end of the conduit directly into the bag.

3. A machine as set forth in claim 1 wherein the nut collecting chamber has a normally closed depending pebble trap.

4. A machine as set forth in claim 1 wherein the separating chamber includes an upper wall extending rearward and upward, side walls, a vertical rear wall, a vertical front wall, a bottom wall and an intermediate wall of screen-like formation which is spaced above the bottom wall and extends rearward and upward, the sections of flexible tubing are connected to the front wall, the bottom wall extends from the front wall and has an opening below the sections of flexible tubing, the intermediate wall extends downward to the opening, a pipe element extends from the opening to the air-lock chamber and provides the communication between the casing of the air-lock chamber and the separating chamber, the side walls, bottom wall and rear wall providing a pebble receiving pocket below the intermediate wall, the bottom wall and the rear wall are convergent, and means is provided which is operable at will for discharging the pebbles from the pocket, the means being held normally to close the pocket.

5. A machine as set forth in claim 4 wherein the nut collecting chamber has a normally closed depending pebble trap which may be opened at will for the discharge of the pebbles.

6. A machine as set forth in claim 4 wherein the upper, side and rear walls of the separating chamber define a rectangular opening and the conduit for the discharge of the leaves is connected to these walls in registry with the opening, and the intermediate wall is connected to the rear wall at a point below the opening.

7. A machine as set forth in claim 4 wherein the upper, side and rear walls of the separating chamber define a rectangular opening, the conduit for the discharge of the leaves is connected to these walls in registry with the opening, the intermediate wall is connected to the rear wall at a point below the opening, and the intermediate wall includes a series of parallel bars in sufficiently close relation to support the nuts for downward gravitating movement.

8. A machine as set forth in claim 4 wherein the upper, side and rear walls of the separating chamber define a rectangular opening, the conduit for the discharge of the leaves is connected to these walls in registry with the opening, the intermediate wall is connected to the rear wall at a point below the opening, certain of the sections of flexible tubing as connected to the separating chamber being located above the area of communication between the separating chamber and the air-lock chamber and others of the sections of flexible tubing being located laterally beyond such area, and the intermediate wall has laterally and upwardly inclined portions also located laterally beyond such area.

9. A machine as set forth in claim 4 wherein the upper, side and rear walls of the separating chamber define a rectangular opening, the conduit for the discharge of the leaves is connected to these walls in registry with the opening, the intermediate wall is connected to the rear wall at a point below the opening, certain of the sections of flexible tubing as connected to the separating chamber being located above the area of communication between the separating chamber and the air-lock chamber and others of the sections of flexible tubing being located laterally beyond such area, and the intermediate wall has laterally and upwardly inclined portions also located laterally beyond such area, and the intermediate wall includes a series a parallel bars in sufficiently close relation to support the nuts for downward gravitating movement.

10. A machine as set forth in claim 1 wherein the separating chamber includes a normally closed pebble receiving pocket and an enclosed intermediate wall of screen formation extending rearward and upward from a line below and in spaced relation to the points of communication with the separating chamber of the sections of flexible tubing, the pebbles being carried along with the nuts into the separating chamber and falling by gravity through the intermediate wall into the pocket and the nuts falling upon the intermediate wall and moving downward by gravity along the intermediate wall, the nuts upon reaching the lower end of the intermediate wall falling through it into the rotatable compartments of the air lock chamber and falling from them into the nut collecting chamber.

11. A machine as set forth in claim 10 wherein a frame for the support of a nut receiving bag in a vertical position with an open upper end is provided at the rear end of the chassis and the nut conveying and discharging conduit has support adjacent its discharge end and has its discharge end above the open end of the bag as supported by the frame, the nuts falling from the discharge end of the conduit directly into the bag.

References Cited in the file of this patent

UNITED STATES PATENTS

| | | |
|---|---|---|
| 2,502,810 | Waters | Apr. 4, 1950 |
| 2,593,625 | Stokes | Apr. 22, 1952 |
| 2,716,856 | Burns | Sept. 6, 1955 |